Feb. 8, 1938.　　　F. P. MILLER ET AL　　　2,108,009
SLIDE FASTENER
Original Filed June 22, 1934
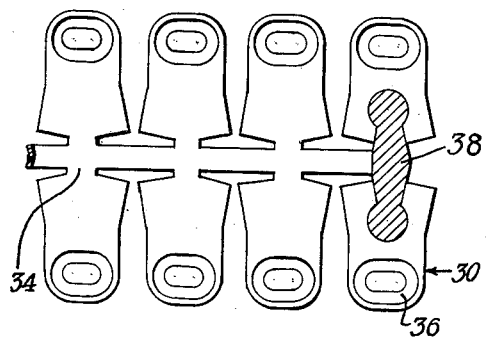
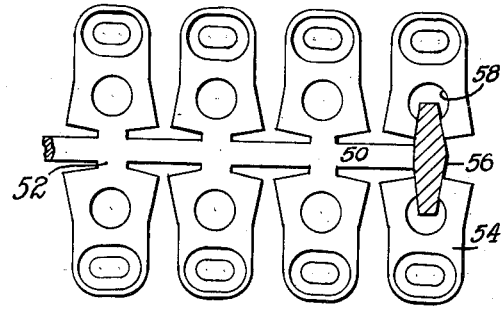
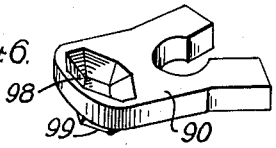
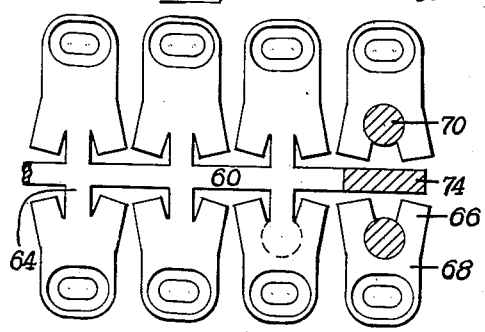
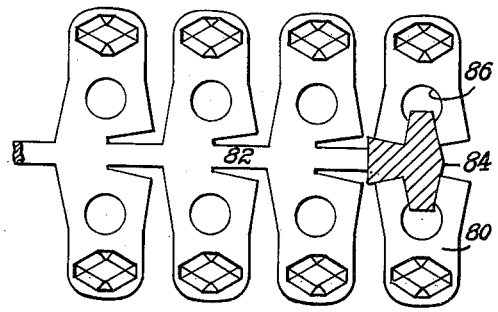
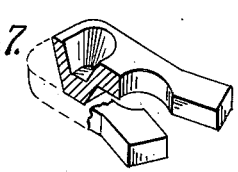
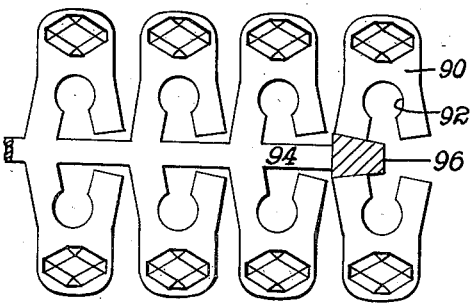
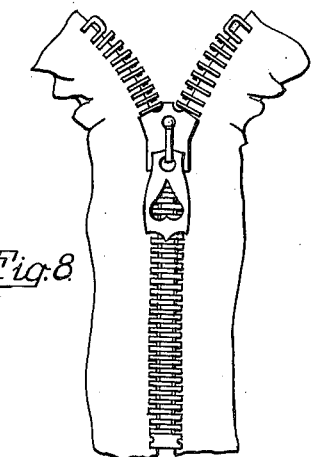
INVENTORS
Frank P. Miller and
Lewis Skeel
BY Green & McCallister
Their ATTORNEYS.

REISSUED

Patented Feb. 8, 1938    JAN 16 1940    2,108,009

UNITED STATES PATENT OFFICE 2,108,009

SLIDE FASTENER

Frank P. Miller and Lewis Skeel, Meadville, Pa., assignors, by mesne assignments, to Joy Fastener Company, a corporation of Pennsylvania Original application June 22, 1934, Serial No. 731,995. Divided and this application June 2, 1937, Serial No. 145,997

21 Claims. (Cl. 24—205)

This application relates to slide fasteners and is a divison of our application bearing Serial Number 731,995.

Briefly, the invention of this application looks to the production of slide fasteners in strip form and more particularly, in spaced relation along at least one edge of a band, webbing or ribbon to achieve, among other things, a reduced cost of manufacture; and to provide for the easy handling of the fastener elements during buffing, coloring, and such other intermediate processes as may be employed.

By way of preliminary reference to the coloring of the fastener elements in any selected manner and while still in strip form, it is pointed out that the connection of the fastener elements with the supporting webbing or band thereof is such that, although the fastener elements are severed from the supporting band after the coloring process, there will be left on the fastener elements no raw, uncolored metal edges or surfaces exposed to view, which edges or surfaces would mar the appearance of the finished product, especially when conspicuously in place on a garment, a handbag or one of the numerous other articles to which slide fasteners are applied.

Another advantage in the formation of the fastener elements in spaced relation and attached to a continuous web or band will be found to reside in the ease and efficiency with which the fastener elements may be presented to the cutting-off or severing mechanism and the assembly device.

In addition, the invention makes provision for the buffing of the fastener elements while still in strip form and immediately after the forming or punching operation to avoid special handling of the fastener elements for this purpose and, at the same time, to avoid an appreciable increase in the cost of manufacture due to the buffing operation, it being observed in passing that the proper and inexpensive buffing of fastener elements to remove burrs and sharp edges therefrom is recognized in this art as quite a problem.

The invention also contemplates a novel form of interfitting male and female connection between the completed fastener elements, which connection will be found to simplify manufacture; make possible the formation of the individual fastener elements with slightly rounded ends to the interlocking heads to add to the appearance of the finished article; to facilitate the meshing of the interlocking heads of the fastener elements and, at the same time, to limit rocking movement of the fastener elements, one with respect to another when in final interdigitating relation.

Other objects and advantages will be apparent during the course of the following description.

In the accompanying drawing forming a part of this application and in which like numerals are employed to designate like parts throughout the same, Fig. 1 is a fragmentary plan view of a strip of fastener elements embodied in the invention, the view illustrating a die in operative relation to oppositely located fastener elements, Fig. 2 is a similar view disclosing a slightly modified form of strip, Fig. 3 is a similar view disclosing another form of strip, Fig. 4 is a similar view disclosing a further form of strip, Fig. 5 is a similar view disclosing another form of strip, Fig. 6 is a perspective of a completed fastener element, Fig. 7 is a fragmentary sectional perspective of a modified form of fastener element, and Fig. 8 is a plan view of a completed slide fastener.

It will be seen that the projections or male members of the interlocking heads of the fastener elements are tapered toward the leading ends thereof while the complemental sockets 36 are flared or enlarged toward the inlet ends thereof for the easy reception of the projections.

Also, the sockets 36 and the resulting projections will be found to be in the form of flattened ovals having parallel side walls in longitudinal cross section joined by approximately semi-circular end walls. This configuration facilitates the connection and disconnection of the elements of the completed fastener and, in addition, makes possible the rounding of the adjacent end portions of the interlocking heads so as to avoid sharp angles or corners which might interfere with the proper bringing together and later separation of the fastener elements in the completed article. The rounding of the end portions of the interlocking heads also adds to the appearance of the completed article.

The arrangement of the rows of fastener elements as shown in Figure 1, and more particularly the connection of the individual fastener elements with the web or band 32 through the intervention of the lateral branches 34, provides a simple and convenient means by which the fastener elements may be colored, dyed or plated while still in strip form. It will be observed that all those surfaces and edges of the fastener elements exposed in the completed slide fastener are exposed for application of a coloring, dyeing, or plating medium, even though the fastener elements are still in strip form.

That is to say, the particular connection between the band 32 and the individual fastener elements calls for the subsequent employment of a cut-off punch 38 of a width and formation to simultaneously cut through oppositely located fastener elements without leaving raw edges that will be exposed in the finished product. When the cut-off punch 38 is advanced, as shown in Figure 1, the oppositely located fastener elements are bifurcated or formed with tape engaging jaws while, at the same time, the fastener elements are severed from the webbing 32 and the lateral branches 34.

Of course, the strip of fastener elements 30 is subjected to the action of the cut-off punch only after the coloring, dyeing or plating operation, and it is important to observe that the raw edges left by the cut-off punch will be engaged with the tape and will not be exposed to view in the completed fastener.

The cut-off punch 38 is shown to have enlarged cylindrically beaded edges with the element engaging sides of the punch in converging relation to form key-hole openings in the fastener elements.

The key-hole openings thus produced in the individual fastener elements, at the jaw portions thereof, of course, might be said to have circular inner portions and diverging side walls, the latter defining gradually restricted entrance openings for the tape.

It is further illustrated in Figure 1 that the jaw portions of the individual fastener elements have the outer edges thereof initially flared or in diverging relation. This provides for the subsequent inward clamping of the jaws in engagement with the tape, bringing the outer edges of the jaws into approximately parallel relation to each other.

Attention is now invited to the fact that the arrangement of the fastener elements in rows at opposite sides of the intervening web, with the various edges of the fastener elements spaced from each other and from the web, not only provides for the coating of the entire surfaces of the fastener elements, but, at the same time, looks to effective and expeditious treatment of the fastener elements to remove therefrom those burrs and sharp edges resulting from the preceding punching operation, all while the fastener elements are still in strip form. This also avoids material waste.

In the form of strip illustrated in Figure 2, the band or ribbon 50 is provided with laterally projecting branches or legs 52 joined with the jaw portions of the fastener elements 54 at the points where the cut-off punch 56 passes through the material forming this strip.

The form of strip shown in Figure 2 differs from the disclosure in Figure 1, in that the individual fastener elements are provided with circular openings formed during the punching operation by which the fastener elements are outlined or given the form shown in Figure 2. This form of strip calls for the employment of the cut-off punch 56 in which the sides thereof diminish in wall thickness toward the outer edges thereof and which punch may be without the beaded outer edges.

The operation of the cut-off punch 56 leaves oppositely located fastener elements 54 with key-hole openings for the reception of mounting tapes, the outer portions of such openings having converging sides to guide the tape into proper position between the tape engaging jaws.

Of course, as one of the final steps in the mounting of the individual fastener elements 54 upon tapes, the jaws are brought into pressure engagement with the tapes and in looking to this, it will be found that the jaw portions of the fastener elements have the outer edges thereof in initially diverging or flared relation so that when the jaws are clamped in engagement with the tapes, the outer edges of the fastener elements will be approximately parallel throughout.

The arrangement of the fastener elements in strip form provides for the buffing of the fastener elements while still in strip form and immediately after the initial forming operation; provides a simple means by which the entire ultimately exposed surfaces of the individual fastener elements may be colored, plated or dyed, and also provides for the twin production of fastener elements at each stroke of the punch press and looks to the accelerated separation of the individual fastener elements from the strip, and the delivery of the fastener elements to assembly units.

In the form of strip disclosed in Figure 3, the central band or ribbon is designated by the numeral 60 and is provided at uniformly spaced points with pairs of laterally projecting branches or lugs 64 extending between the diverging jaws 66 of the fastener elements 68. More specifically, the laterally projecting branches or lugs 64 connect with the individual fastener elements at points between the ends of the elements and the edges of these branches are spaced from the inner edges of the jaws, so that when the cylindrical cut-off punches 70 are advanced to the positions suggested in Figure 3, the individual fastener elements will be given cylindrical recesses and at the same time the branches 64 will be cut off at the points where the same join the fastener elements.

Of course, the strip as shown in Figure 3 was outlined by a previous forming operation from an initially flat metallic ribbon or strip having a width equal to or greater than the distance between the end portions of the interlocking heads of oppositely located fastener elements 68.

It will be seen that although the fastener elements 68 are in strip form, all surfaces and finally exposed edges thereof are available for coloring, dyeing or plating and that the raw edges left by the cut-off punches 70 will not be exposed to view in the completed slide fastener. In addition to looking to the coloring of the individual fastener elements while still in strip form, the form of strip shown in Figure 3 provides a simple means by which all rough edges and burrs resulting from the original forming operation may be removed as a preliminary to the coloring process and while, of course, the fastener elements are still in strip form.

A punch 74 may be positioned between the cut-off punches 70 and caused to operate in unison therewith to cut the central webbing or ribbon 60 into short pieces and thereby avoid an objectionable coiling of this material in the region of the cut-off punches.

Figure 4 shows a form of strip in which the fastener elements 80 are arranged at right angles to the intervening connecting ribbon or band 82 and in the form of parallel rows in which the fastener elements are arranged in spaced edge-to-edge relation.

In this form of strip, the inner or jaw portions of the fastener elements 80 are indirectly joined with the longitudinally extending band or ribbon 82 by means of an intervening approximately triangular portion of ribbon material extending laterally from central web 82, and it requires a cut-off punch 84, somewhat T-shaped in cross-section to complete the tape gripping jaws of the fastener elements and to sever these fastener elements from the central webbing 82.

In the form of strip shown in Figure 4, the fastener elements are provided with circular openings 86 and it is the function of the lateral vanes of the cut-off punch 84 to cut through those portions of the fastener elements between the openings 86 and the opposed or inner ends of the fastener elements. When the cut-off punch 84 has been advanced as shown in Figure 4, the oppositely located fastener elements 80 are provided with jaws having the inner and outer edges thereof in somewhat diverging or flared relation. The flared arrangement of the inner edges of the jaws of the fastener elements provides for the easy entrance of the mounting tapes into the spaces between the jaws and when the jaws have been clamped in engagement with the tapes, both the inner and outer edges of the jaws will be found to be substantially parallel.

It will be seen that only one jaw of each fastener element 80 constitutes the sole connection between each fastener element and the central band 82, and this connection is through an intermediate portion of ribbon material so that when the cut-off punch severs a fastener element from the band 82 by removing this intermediate portion, only one end of one jaw will be left uncolored, it being understood, of course, that the strip of fastener elements as shown in Figure 4 are colored after being buffed and prior to the action of the punch 84.

The action of the die 84 shown in Figure 4 completes the formation of the jaws of the fastener elements and simultaneously severs two fastener elements from the central webbing or ribbon 82. If the strip has been previously colored, the uncolored portion left through the operation of the punch 84 would be of no serious consequence. Such uncolored portion of the fastener element would be at the end of only one of the jaws of the fastener element and such jaw could be arranged so that it would be on the under or inner side of the completed slide fastener and thus concealed from view. However, the point of connection between a particular fastener element 80 and the web 82 is very small and even though exposed to view would be inconspicuous.

The arrangement of fastener elements in strip form as shown in Figure 4 provides for the buffing away of the sharp edges or burrs resulting from the initial forming or outlining operation and at the same time looks to the coloring of the fastener elements while in strip form, it being observed in this connection that the coloring process is materially simplified by having the fastener elements in strip form as distinguished from the coloring of the fastener elements when separated.

In the form of strip disclosed in Figure 5, the fastener elements are designated by the numeral 90 and simultaneously with the original forming or outlining operation the fastener elements are punched to provide key-hole openings 92 defining diverging jaws for engagement with the mounting tape. In this form of strip, the fastener elements are, of course, arranged in edge-to-edge spaced relation and in rows at opposite sides of the central ribbon or web 94 with one jaw of each fastener element connected with the web, through an intermediate portion of ribbon material.

The cut-off die 96 is shown to be somewhat dovetailed and acts between a pair of oppositely located fastener elements 90 to simultaneously detach these fastener elements from the web 94 by removing the intervening material. As in the case of the strip shown in Figure 4, the terminal of one jaw of each fastener element is the only part of the fastener element not exposed for coloring while the fastener elements are still in strip form and, if expedient or desirable, this uncolored portion may be finally arranged so that it is concealed. The forming of the tape receiving openings 92 coincident with the original outlining operation of the fastener elements looks to the removal of the burrs along the walls of the openings 92 at the time the remaining portions of the fastener elements are being buffed.

The fastener elements shown in Figures 4, 5 and 6 are formed with diamond-shaped recesses 98 defining similarly shaped projections 99. Such recesses and projections are reduced or tapered from the surfaces from which the same extend or originate to provide for easy assembly when the completed fastener elements are brought into interfitting relation. More specifically, the bottom of each recess is in the form of a rhombus while the top is octagonal, having all opposed edges parallel and all of equal length in the same plane, the said edges being alternately short and long thereby producing side walls alternately triangular and trapezoidal in form.

At the same time, the form of recess and projection shown in Figures 4, 5 and 6 permits of the formation of the interlocking head portions of the fastener elements with curved or rounded lines, thereby avoiding the sharp corners known to be objectionable for several reasons.

As brought out in the opening paragraphs of this specification, the operation of the forming dies leaves the newly formed fastener elements with rather sharp edges and numerous burrs, which, unless removed, would offer serious interference with the smooth operation of the slider of the completed fastener, and in addition, such burrs and sharp edges frequently snag the sheer and other fabrics with which the same come in contact.

The simple and inexpensive removal of these burrs and sharp edges from the individual fastener elements is recognized as a troublesome problem in this industry and, in appreciation of this, it has been found highly advantageous to buff the fastener elements while still in strip form, which has been found to provide for the most convenient handling and presentation of the fastener elements to the buffing wheels. In other words, no separate handling of the fastener elements is required for presentation of the same to the buffing wheels.

By reference to Figures 1 to 5, inclusive, it will be seen that the various fastener elements are arranged in edge-to-edge spaced relation for engagement on all surfaces thereof by the buffing wheels.

With the strip of newly formed and buffed fastener elements thus coiled upon the reel, the reel may be removed from its mounting and conducted to a coloring, dyeing, or plating room where the fastener elements are suitably colored while still in strip form.

Having thus described our invention, what we claim as new and desire to secure by Letters Patent is:—

1. An article of manufacture, comprising a ribbon-like member having a series of fastener elements disposed along at least one side thereof, characterized by the fact that each element is unitarily connected to said ribbon-like member and provided with tape gripping jaws at one end and an interlocking head at its other end.

2. An article of manufacture, comprising a web or band of suitable material and of indeterminate length having completely shaped fastener elements formed integrally therewith and extending laterally from one edge thereof, each of said elements having tape gripping jaws at one end and an interlocking head at its other, individual elements being obtained by severing the same from the web or band.

3. An article of manufacture, comprising a web or band of suitable material of indeterminate length and having shaped fastener elements each of which has tape gripping jaws at one end and an interlocking head at the other end formed integrally therewith and extending transversely from one edge thereof; the longitudinal axes of said elements being at right angles to the longitudinal axis of the web or band.

4. An article according to claim 1, characterized by the fact that the ends of the jaws of the fastener elements are spaced from the adjacent edge of the ribbon-like member.

5. An article according to claim 1, characterized by the fact that each element is unitarily connected to the ribbon-like member by a neck portion disposed between the jaws thereof and which is united at one end with the support member and at the other end with the element between its tape gripping jaw portions.

6. An article of manufacture, made from metal and comprising a ribbon-like support member having a series of fastener elements disposed in juxtaposition to one edge thereof and in spaced relation one to another and to said edge; said elements each having tape gripping jaws at one end and an interlocking head at the other and each being unitarily connected to the adjacent edge of said support member by an intervening neck portion.

7. An article according to claim 1, characterized by the fact that a series of said fastener elements is disposed along both longitudinal edges of the ribbon-like member.

8. An article of manufacture, comprising a ribbon-like member having a series of fastener elements extending laterally from at least one side thereof in fixed spaced relation and each having at least partially formed tape gripping jaws at one end and an interlocking head at the other end and each being unitarily connected to the ribbon-like member by a neck portion.

9. An article of manufacture, comprising a series of spaced metallic fastener elements each of which has at least partially formed tape gripping jaws at one end and an interlocking head at the other end, and a metallic ribbon-like member formed in one piece with said elements for holding and supporting the same while subsequent operations are performed on said elements.

10. An article of manufacture, comprising a band or web of suitable material and having substantially completely shaped fastener elements along a side thereof in spaced relation one to another; said band or web having a laterally projecting portion associated with each element and unitarily uniting the same to the band or web; each of said elements having an interlocking head at one end and spaced portions at the other end which, when said element is severed from its associated projecting portion, form tape gripping jaws.

11. An article according to claim 10, characterized by the fact that the laterally projecting portions are so shaped and joined to the fastener elements that, when an element is severed therefrom the severed surfaces will form at least a portion of the tape gripping surfaces of the tape gripping jaws.

12. A stock strip comprising substantially completely formed fastener elements each having an interlocking head at one end and tape gripping jaw portions at the other end and a band or ribbon-like portion to which said elements are unitarily connected.

13. A metal stock strip comprising uniformly spaced substantially completely formed fastener elements each having an interlocking head at one end and tape gripping jaw portions at the other end and a band or ribbon-like portion to which said elements are unitarily connected.

14. A metal stock strip comprising uniformly spaced substantially completely formed fastener elements each having an interlocking head at one end and tape gripping jaw portions at the other end and a band or ribbon-like portion to which said elements are unitarily connected adjacent the tape gripping jaw portions thereof.

15. A stock strip comprising colored fastener elements each having an interlocking head at one end and tape gripping jaw portions at its other end and a band or a ribbonlike portion to which each of said elements is unitarily connected by a portion which extends laterally therefrom to a position between its jaw portions.

16. A metal stock strip comprising uniformly spaced buffed and colored fastener elements each having an interlocking head at one end and tape gripping jaw portions at its other end and a band or ribbon-like portion to which each of said elements is unitarily connected by a portion which extends laterally from the ribbon-like portion to a position between its jaw portions.

17. A metal stock strip comprising a band or ribbon portion, uniformly spaced smoothed and colored fastener elements each having an interlocking head at one end and tape gripping jaw portions at its other end and connecting portions which extend laterally from the ribbon portion to positions between the fastener element jaw portions whereby when said connecting portions are severed from the jaw portions the inner-adjacent faces of the tape gripping jaws will be the only uncolored portions of the fastener elements.

18. A stock strip comprising a web or ribbon having equally spaced branches extending laterally therefrom and a slide fastener element joining each branch and which has an interlocking head at its outer or free end and tape gripping jaws at its branch end.

19. A stock strip comprising a central web or ribbon having branches extending laterally therefrom in opposite directions and fastener elements having interlocking heads and tape engaging jaw portions connected to said branches.

20. In a stock strip, a pair of spaced parallel rows of slide fastener elements arranged in side by side relation, a central web or ribbon extending lengthwise between said rows and having laterally extending branches connected with the tape gripping jaw portions of said fastener elements.

21. In a structure of the class described, a pair of rows of preformed slide fastener elements, the fastener elements of one row being provided with jaw portions in opposed relation to the jaw portions of the fastener elements of the other row, and a central web between such rows and having laterally projecting branches which extend between the said jaw portions.

FRANK P. MILLER.
LEWIS SKEEL.